United States Patent [19]
Galia

[11] 4,433,797
[45] Feb. 28, 1984

[54] METERED QUANTITY DISPENSING VALVE

[76] Inventor: Karl Galia, Oehningen, Fed. Rep. of Germany

[21] Appl. No.: 300,277

[22] Filed: Sep. 8, 1981

Related U.S. Application Data

[62] Division of Ser. No. 150,694, May 16, 1980, abandoned.

[30] Foreign Application Priority Data

May 21, 1979 [DE] Fed. Rep. of Germany ....... 2920497
Nov. 20, 1979 [DE] Fed. Rep. of Germany ....... 2946814

[51] Int. Cl.³ .............................................. B65D 83/14
[52] U.S. Cl. ................... 222/207; 222/214; 222/335; 222/386.5; 222/402.2
[58] Field of Search ..................... 222/207, 214, 386.5, 222/402.2

[56] References Cited

U.S. PATENT DOCUMENTS

| | | | |
|---|---|---|---|
| 2,529,028 | 11/1950 | Landon | 222/386.5 |
| 3,104,785 | 9/1963 | Beard, Jr. | 222/207 |
| 3,377,004 | 4/1968 | Kjelson | 222/402.2 |
| 3,705,667 | 12/1972 | Blanie et al. | 222/386.5 |

FOREIGN PATENT DOCUMENTS 1299724 6/1962 France ........................... 222/402.20

*Primary Examiner*—Joseph J. Rolla
*Assistant Examiner*—Frederick R. Handren
*Attorney, Agent, or Firm*—David A. Jackson; Daniel H. Bobis

[57] ABSTRACT

In a pressure vessel containing fluid or pasty product and equipped with a manually operable discharge valve spring-biased to a closed position, dispensing means for allowing a metered amount of said product to reach said discharge valve on operation thereof comprise a housing defining a metering chamber which is closed by a flexible diaphragm and can communicate with the discharge valve by way of a connecting passage. Further valve means disposed between the vessel interior and the metering chamber are adapted to be closed when the discharge valve is opened to expel the metering chamber contents and to be opened for replenishing the metering chamber when the discharge valve is closed.

9 Claims, 5 Drawing Figures

METERED QUANTITY DISPENSING VALVE

This application is a division of application Ser. No. 150,694, filed May 16, 1980, now abandoned.

The invention relates to a dispensing valve for delivering a liquid or pasty product from a vessel surrounding a pressure space, comprising a valve body in the vessel that has a valve which is normally held in the closed condition by a spring and can be opened against the pressure thereof, and a connecting passage in the valve body extending between the pressure space and valve.

Vessels of the kind just referred to are known as aerosol containers or uni-chamber cans on the one hand and as double-chamber cans on the other hand. In a uni-chamber can, the product and a propellant gas are enclosed in a single stable vessel. On the other hand, a double-chamber can consists of a stable vessel and an elastic bag held therein. The elastic bag contains the product and the propellant gas is disposed in the space between the bag and the stable vessel. In both cases, the product is expelled from the vessel by the propellant gas either mixed therewith or alone when the valve is opened. The volume expelled depends substantially on the time for which the valve is opened. In general, the valves are opened simply by pressing. This simple manipulation often results in keeping the valve open for too long and excessive product being expelled. This causes the product to be wasted. When using a product for therapeutic or cosmetic purposes, the surplus amount of product can cause disadvantages.

It is therefore an object of the present invention to provide a dispensing valve for vessels of this kind by means of which the product can be withdrawn from the vessel in only a metered amount. According to the invention, this object is achieved in that a chamber formed in the valve body is on the one hand connected or connectible to the connecting passage and on the other hand has a side open towards the pressure space, that the open side is covered by an elastic diaphragm, and that valve means provided between the pressure space and the chamber are open when the valve is closed, and vice versa. In this construction of dispensing valve, when the valve is in the closed position the chamber is connected to the pressure space by the valve means that are then open. The chamber is filled with product and, in the case of uni-chamber cans, with the mixture of product and propellant gas. The diaphragm is in a rest position defined by its inherent resilience. If it was previously in a stressed condition, it moves to this rest position under its resilience during the filling operation. During this filling operation, the chamber, which has a volume in the order of about 1 to 5 cm$^3$, is rapidly filled.

On opening the discharge valve, the valve means between the pressure space and chamber are actuated. They close and block the connection between the pressure space and chamber. However, on opening the discharge valve, the chamber is opened to atmosphere. The product disposed in the chamber under pressure enters the connecting passage and is discharged to the outside by way of the discharge valve. This causes the product to be expelled from the chamber because the diaphram between the chamber and the pressure space is subjected to the pressure acting on it from the side of the pressure space and it is pressed into the chamber. The pressure difference therefore causes the product in the chamber to be ejected hydraulically. By reason of the short distance between the chamber and atmosphere resulting from the low structural height of the valve body, the product is expelled instantaneously without delay on pressing the valve. The ejected quantity is restricted to the volume of the chamber. This ensures economical use of the product. Increased delivery of the product calls for renewed and intentional pressure on the valve. This requirement for intentional pressure cannot be unintentional. This, again, ensures that the product will not be unintentionally dispensed in excess amounts.

In one embodiment, a valve between the connecting passage and the chamber is displaced between the closed and open positions in synchronism with the valve in the valve body. This brings about additional blocking of the chamber and thus also of the pressure space from the connecting passage. On filling the chamber from the pressure space, it alone is filled with the pressurized product and not also the connecting passage.

The valve means between the chamber and pressure space and the valve between the chamber and connecting passage must be actuated at the same time as the valve in the valve body. For this purpose, one suitable construction provides for a valve rod connected to the closing member of this valve to be guided in the connecting passage and for the said valve means and the said valve between the connecting passage and the chamber to be connected to said valve rod. This achieves a simple mechanical interconnection of the different valves.

It has been mentioned that the diaphragm closing the chamber from the pressure space is pressed into the chamber under the pressure in the pressure space as soon as the chamber has been connected to atmosphere to discharge same. It thereby additionally expels the product from the chamber by mechanical means. In order that the diaphragm is subjected to pressure over as large an area as possible and also has sufficient area to come to lie in the chamber without excessively increasing its inherent stress, a desirable embodiment provides for the side of the chamber that is directed towards the pressure space and closed by the diaphragm to be its largest side. This necessarily gives the largest possible area to the diaphragm.

There are several possibilities for the construction and shape of the chamber itself. In one desirable embodiment, the chamber has a continuously reduced cross-section from its largest side facing the pressure space towards its junction with the connecting passage. Such a continuous reduction in cross-section without corners and edges ensures that the entire area of the diaphragm will come to lie on the inner wall of the chamber and no pockets will be formed in which the product is held back. In one embodiment of the invention, the chamber is of semi-elliptical or semi-circular cross-section. The chamber can also be formed at different positions of the valve body. One possibility according to the invention provides for the chamber to be formed in a base section of the valve body in the base thereof and to all intents and purposes constitute a concavity in said base. Another possibility according to the invention is that the chamber is formed as a rotationally symmetrical constriction of the wall of a cylindrical valve body.

It has been mentioned that valve means are provided between the pressure space and chamber. For their construction, one desirable embodiment provides that a cylinder opening into the chamber is provided in the valve body as part of the connecting passage, a piston connected to the valve rod is guided in the cylinder into which two passages open at a spacing from each other, of which one leads to the pressure space and the other to the chamber, and that the dimensions are so adapted to the stroke of the valve rod that the passages are alternately opened and closed by the piston such that the chamber is connected to the pressure space by the one passage or to the connecting passage by the other passage. The chamber is thereby connected either to the pressure space for filling or to the connecting passage for emptying. In the first case, it is simultaneously separated from the connecting passage and in the second case it is simultaneously separated from the pressure space.

The cylinder just mentioned is desirably connected to the chamber by a short aperture and the piston is seated on the aperture in its one limiting position. In this way, the dead space out of which the product cannot be expelled into the connecting passage is restricted to the small volume of this aperture.

In the embodiment where the chamber is constantly connected to the connecting passage, this is preferably effected through passages provided in the connecting passage.

The invention will now be described further with reference to embodiments illustrated in the drawing, wherein.

Figure 1:
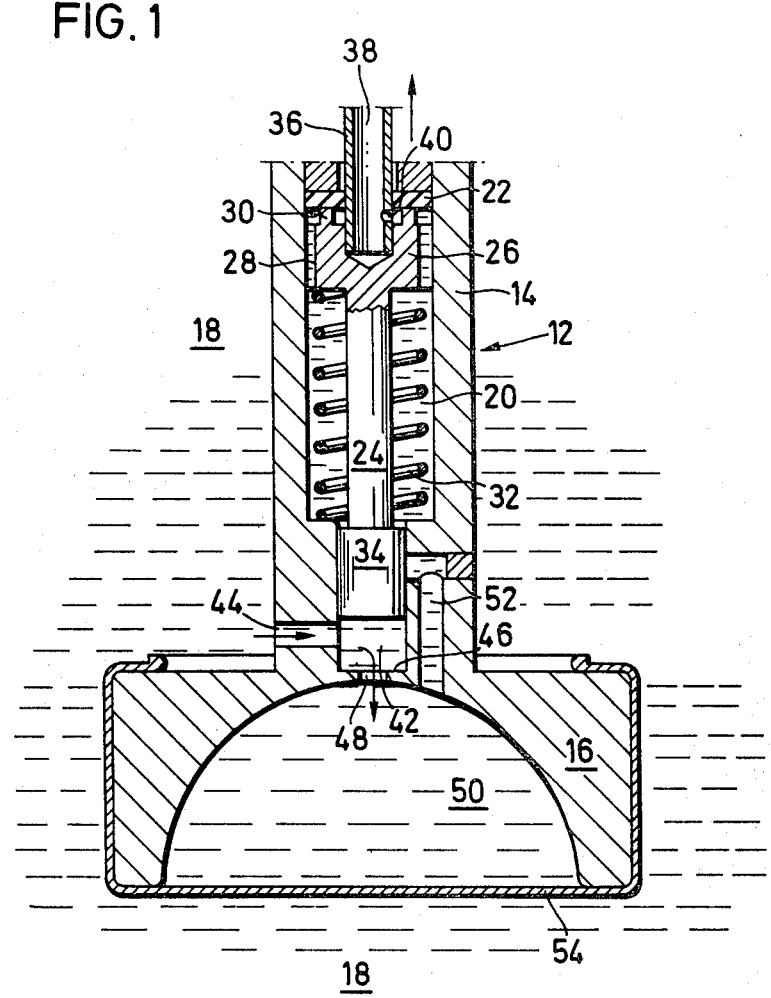
FIG. 1 is a longitudinal section through the valve body of the one embodiment in the reset position or during filling of the chamber.
Figure 2:
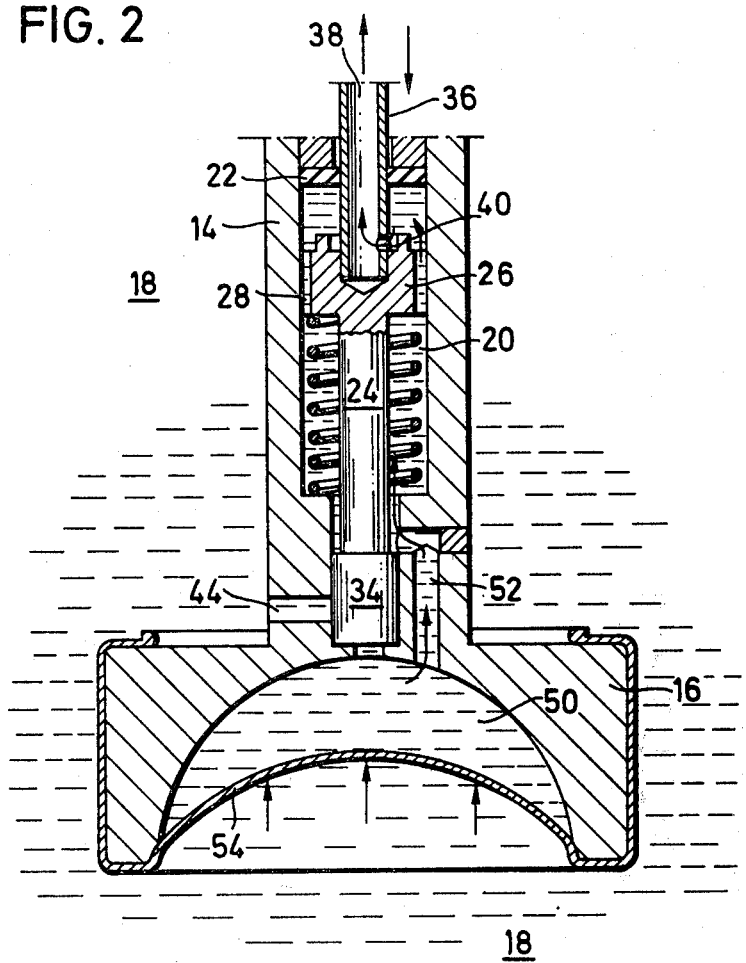
FIG. 2 is a longitudinal section through the same valve body when the valve is actuated or the chamber is emptied.

FIGS. 1 and 2 show a valve body 12 with a neck-like section 14 and a base section 16 of larger diameter.

The valve body 12 is disposed in the pressure space 18 of a vessel (not shown). The filling of this vessel is indicated by broken lines. The neck-like section contains a cylindrical recess 20. At its upper end, there is the valve seat 22 represented by a sealing washer. The valve rod 24 passes through the recess 20 and carries the valve closing member 26. It is provided with grooves 28 at its circumference. The valve closing member 26 has a projection 30 abutting the valve seat 22 from underneath. It is subjected to the pressure of a spring 32. At its lower end, the valve rod 24 carries a piston 34. A small tube 36 is inserted in the valve closing member 26 from above. It contains a longitudinal aperture 38 and a transverse aperture 40. The piston 34 is seated in a cylinder 42 and is displacable therein. From the cylinder 42, an aperture 44 extends into the pressure space 18. An aperture 48 is disposed in the cylinder base 46. It leads into the chamber 50 provided in the base section 16. A passage 52 consisting of two bores at right-angles to each other leads from the chamber 50 to the cylinder 42. A diaphragm 54 is stretched on the base section 16 and closes the chamber 50 from the pressure space 18. This concludes the detailed description of the first embodiment.

One operating sequence will now be described with reference to FIGS. 1 and 2. In the rest position shown in FIG. 1, the spring 32 presses the movable components upwardly. The valve in the upper end of the valve body 12 is closed. The piston 34 exposes the aperture 44. On the other hand, it closes the passage 52. Complete equalisation of pressure takes place or has already taken place between the pressure space 18 and the chamber 50 by way of the aperture 44, the cylinder 42 and the aperture 48. The chamber 50 is filled with product. To discharge the product, the tube 36 is depressed. The piston 34 closes the aperture 44. It opens the passage 52. Simultaneously, the valve closing member 26 has been removed from the valve seat 22. The chamber 50 is thus connected to atmosphere by way of the passage 52, past the valve rod 24, by way of the recess 20, the free spaces between the grooves 28, the transverse aperture 40 and the longitudinal aperture 38. The pressure in the chamber 50 now becomes lower. The chamber 50 is emptied. The diaphragm 54 is thus subjected on one side to the pressure of the pressure chamber 18 in the direction of the arrows. It moves into the chamber 50 until it abuts the inner wall. The entire product has then been expelled. Following discharge of the volume of product contained in the chamber 50, the tube 36 is released. The spring 20 presses the movable components back to the starting position of FIG. 1. The chamber 50 is replenished and can subsequently again be emptied.

Figure 4:
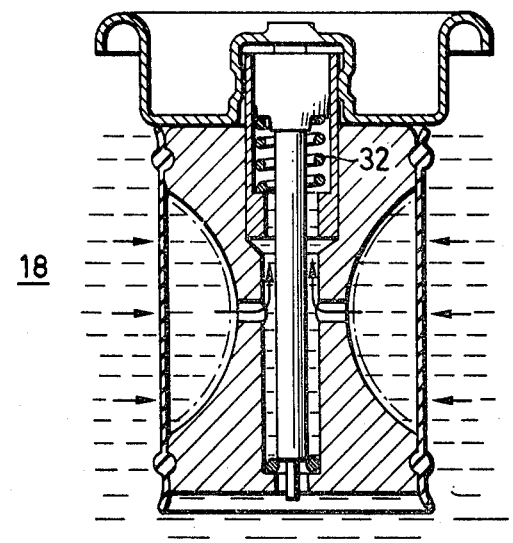
FIG. 4 is a longitudinal section through the same valve body on actuation of the valve or during emptying of the chamber.
Figure 3:
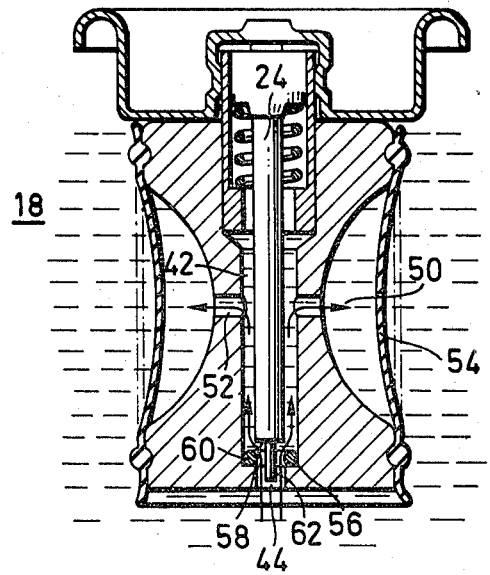
FIG. 3 is a longitudinal section through the valve body of the second embodiment in the rest position or during filling of the chamber.

Whereas in the FIGS. 1 and 2 embodiment a semi-circular chamber 50 was provided in the base section 16, it is disposed in the wall of the cylindrical valve body in the case of the FIGS. 3 and 4 embodiment. In this embodiment, the chamber 50 is connected directly to the cylinder 42 by way of passages 52. The cylinder extends over almost the entire length of the valve rod 24. At its lower end, it has a valve seat 56. On this there is a sealing ring 60. The latter co-operates with the lower end 58 of the valve rod 24. The end 58 forms a valve closing member. A pin 62 is placed on the end 58 and passes through the aperture 44. This embodiment functions as follows.

In the rest position of FIG. 3, the spring 32 has pushed the movable components upwardly. The end 58 of the valve rod 24 is removed from the sealing ring 60. Product enters the cylinder 42 in the direction of the arrows and flows into the chamber 50 through the passages 52. The diaphragm 54 is pushed outwardly up to its chaindotted line. There is then complete pressure equalization and the chamber 50 is filled. For emptying, the valve rod 24 is depressed. The end 58 of the valve rod 24 forming the valve closing member becomes seated on the sealing ring 60. The connection between the pressure space 18 and chamber 50 is interrupted. Simultaneously, the valve in the upper region of the valve body is opened and the chamber 50 can be emptied. The product is expelled in the direction of the arrows shown in FIG. 4. The outside of the diaphragm 54 is subjected to the pressure of the pressure space 18 and the diaphragm contracts. It finally assumes the limiting position shown in chain-dotted lines. The chamber 50 is completely empty. Upon release of the valve rod 24, the spring 32 becomes effective and pushes the movable components to the rest position of FIG. 3. The chamber 50 can now become full again.

Figure 5:
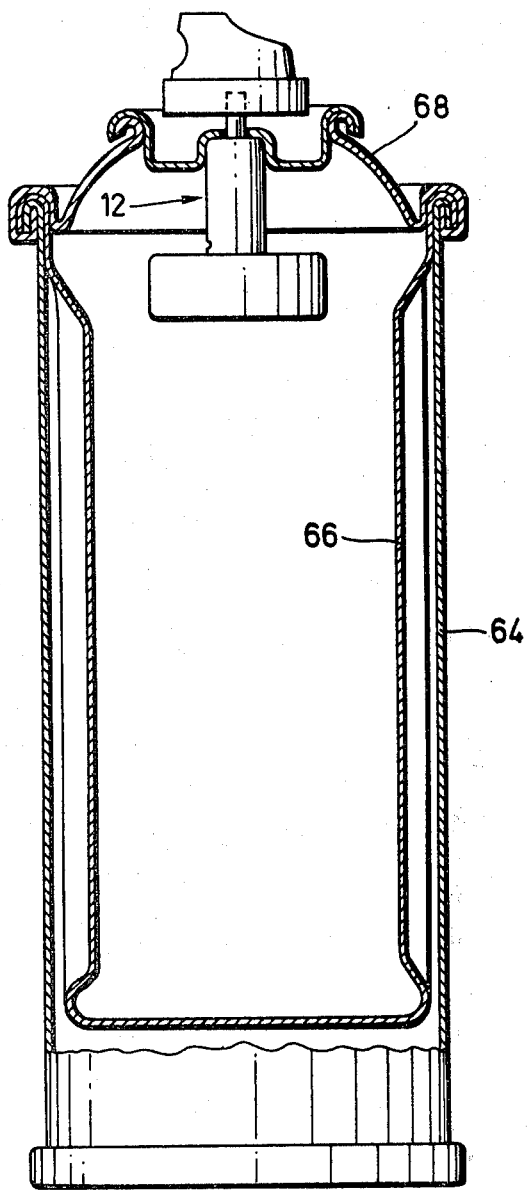
FIG. 5 is a fragmentary side elevation of a double-chamber can showing the disposition of the dispensing valve according to the invention.

FIG. 5 shows a vessel 64 in a broken open condition. It contains an inner bag 66 of elastic material. It is filled with product. The space between the vessel 64 and inner bag 66 is on the other hand filled with a propellant gas such as compressed air. The dispensing valve according to the invention is disposed in the cover 68 of the vessel 64. The vessel 64 with inner bag 66 constitutes a double-chamber can. As mentioned previously, the dispensing valve according to the invention can also be used for a uni-chamber can.

I claim:

1. A valve assembly for dispensing a metered quantity of a flowable product from a container having a pressurized interior ambient, said valve assembly when installed in said container comprising:
    A. a valve body having a discharge portion extending out of said container, and a main body portion residing within said pressurized ambient;
    B. said valve body defining a primary flow passage extending through from said discharge portion to said main body portion, enabling said flowable product to be expelled from said container;
    C. spring biased discharge valve means positioned within said discharge portion to release said flowable product from said container;
    D. product metering container means positioned within said pressurized interior ambient, in fluid registry with said main body portion, having a metering chamber adapted to hold a predetermined quantity of said flowable product, said metering chamber defined by a member having a rigid concave inner wall and a resilient wall positioned over said concave inner wall in fluid-tight engagement with said member about the entire outer boundary of said concave inner wall, said resilient wall exposed to said pressurized ambient and adapted to collapse against said concave inner wall in response to fluid pressure to expel flowable material from said chamber;
    E. a secondary flow passage connecting said metering chamber and said primary flow passage;
    F. a tertiary flow passage providing a fluid inlet to said chamber from said pressurized interior ambient; and
    G. a second flow-switching valve means positioned in communication with said product metering container means, actuated in response to the operation of said discharge valve means, to prevent ingress of said flowable product from said pressurized interior ambient into said chamber when said discharge valve means is positioned to enable the expulsion of said flowable product out of said chamber and said container to occur.

2. The valve assembly of claim 1 wherein a valve rod extends from said discharge valve means, through said primary flow passage, and connects with said second flow-switching valve means.

3. The valve assembly of claim 1 wherein said product metering container means is integral with said valve body, said main body portion defines a generally cylindrical outer surface, said rigid concave inner wall is defined by a rotationally symmetrical constriction of said generally cylindrical outer surface, and said resilient wall is annularly disposed about the outer surface of said main body portion, at said rotationally symmetrical constriction.

4. The valve assembly of claim 3 wherein said metering chamber is connected to said primary flow passage by a plurality of secondary flow passages.

5. A valve assembly for dispensing a metered quantity of a liquid or pasty product from a pressurized container, said valve assembly when installed in said container comprising:
    a valve body adapted to be conected to said container and having a discharge portion extending out of said container and a main body portion adapted to be positioned within said container, the lower face of said main body portion having a concave recess therein, said valve body further having a first flow passage extending from said recess to said discharge portion and a second flow pass connecting said recess to the interior of said container;
    an elastic diaphragm connected to said main body portion and overlying said recess, the wall of said recess and said diaphragm together defining a metering chamber;
    manually operable first valve means for connecting and disconnecting said discharge portion and said first flow;
    second valve means movable between a first position blocking said first flow passage and opening said second flow passage and a second position blocking said second flow passage and opening said first flow passage;
    means for biasing said first valve means to disconnect said discharge portion and said first flow passage; and
    means interconnecting said first and second valve means for operation in synchronization.

6. The valve assembly of claim 5 said interconnecting means comprises a valve rod carrying said first and second valve means at opposite ends thereof.

7. The valve assembly of claim 6 wherein said means for biasing comprises a spring.

8. The valve assembly of claim 5 wherein said recess is of semi-circular configuration in cross-section.

9. The valve assembly of claim 5 wherein said recess is of semi-elliptical configuration in cross-section.

* * * * *